| (12) | United States Patent | (10) Patent No.: | US 11,999,514 B2 |
|---|---|---|---|
| | Lee | (45) Date of Patent: | Jun. 4, 2024 |

(54) DRONE PROPELLER FOR PREVENTING COMPLETE DESTRUCTION AND DRONE COMPRISING SAME

(71) Applicant: Min Cheol Lee, Incheon (KR)

(72) Inventor: Min Cheol Lee, Incheon (KR)

( * ) Notice: Subject to any disclaimer, the term of this patent is extended or adjusted under 35 U.S.C. 154(b) by 118 days.

(21) Appl. No.: 17/921,622

(22) PCT Filed: May 27, 2021

(86) PCT No.: PCT/KR2021/006571
§ 371 (c)(1),
(2) Date: Oct. 26, 2022

(87) PCT Pub. No.: WO2021/246709
PCT Pub. Date: Dec. 9, 2021

(65) Prior Publication Data
US 2023/0159189 A1 May 25, 2023

(30) Foreign Application Priority Data
Jun. 3, 2020 (KR) .................. 10-2020-0067007

(51) Int. Cl.
*B64U 10/10* (2023.01)
*B64U 30/20* (2023.01)
*F16B 21/12* (2006.01)

(52) U.S. Cl.
CPC ............. *B64U 10/10* (2023.01); *B64U 30/20* (2023.01); *F16B 21/12* (2013.01)

(58) Field of Classification Search
CPC ........ B64U 10/10; B64U 30/20; B64U 10/13; B64U 50/13; F16B 21/12; B64C 39/024; B64C 27/473; Y02T 50/30; Y02T 50/60
See application file for complete search history.

(56) References Cited

U.S. PATENT DOCUMENTS

| 6,086,014 | A | * | 7/2000 | Bragg, Jr. | ................. | B60F 5/02 |
| | | | | | | 244/49 |
| 6,786,450 | B1 | * | 9/2004 | Einstein | ................... | B64C 3/56 |
| | | | | | | 244/45 R |
| 9,150,301 | B2 | * | 10/2015 | Liu | ........................ | B64U 30/14 |
| 2006/0091258 | A1 | * | 5/2006 | Chiu | ..................... | B64U 20/40 |
| | | | | | | 244/119 |

(Continued)

FOREIGN PATENT DOCUMENTS

| JP | 2014-088170 A | 5/2014 |
| KR | 10-2013-0066540 A | 6/2013 |

(Continued)

OTHER PUBLICATIONS

International Search Report for PCT/KR2021/006571 mailed Sep. 8, 2021 from Korean Intellectual Property Office.

*Primary Examiner* — Medhat Badawi
(74) *Attorney, Agent, or Firm* — Revolution IP, PLLC

(57) ABSTRACT

A drone propeller of the present invention includes a plurality of blades and a rotary shaft, wherein the blades comprise a rotation retaining unit connected to the rotary shaft side, a separation and detachment unit that is on the outer side of the blades and is to be separated when damaged, and a breakage inducing unit which connects the rotation retaining unit and the separation and detachment unit and is damaged during a collision.

7 Claims, 3 Drawing Sheets

(56) References Cited

U.S. PATENT DOCUMENTS

| | | | | |
|---|---|---|---|---|
| 2013/0099060 A1* | 4/2013 | Dees | ............... | B64C 3/58 |
| | | | | 244/199.4 |
| 2014/0008487 A1* | 1/2014 | Liu | ............... | B64U 30/14 |
| | | | | 244/49 |
| 2015/0192029 A1* | 7/2015 | Roberts, III | ............ | F01D 11/08 |
| | | | | 415/173.1 |
| 2018/0163554 A1* | 6/2018 | O'Leary | ............... | F01D 5/147 |
| 2020/0208527 A1* | 7/2020 | Widener | ............... | F01D 5/147 |
| 2023/0159189 A1* | 5/2023 | Lee | ............... | B64U 30/20 |
| | | | | 244/34 R |

FOREIGN PATENT DOCUMENTS

| | | |
|---|---|---|
| KR | 10-1808855 B1 | 12/2017 |
| KR | 10-1859162 B1 | 5/2018 |
| KR | 10-1907649 B1 | 10/2018 |
| KR | 20-2019-0002525 U | 10/2019 |
| KR | 10-2020-0028578 A | 3/2020 |

\* cited by examiner

[FIG. 1]
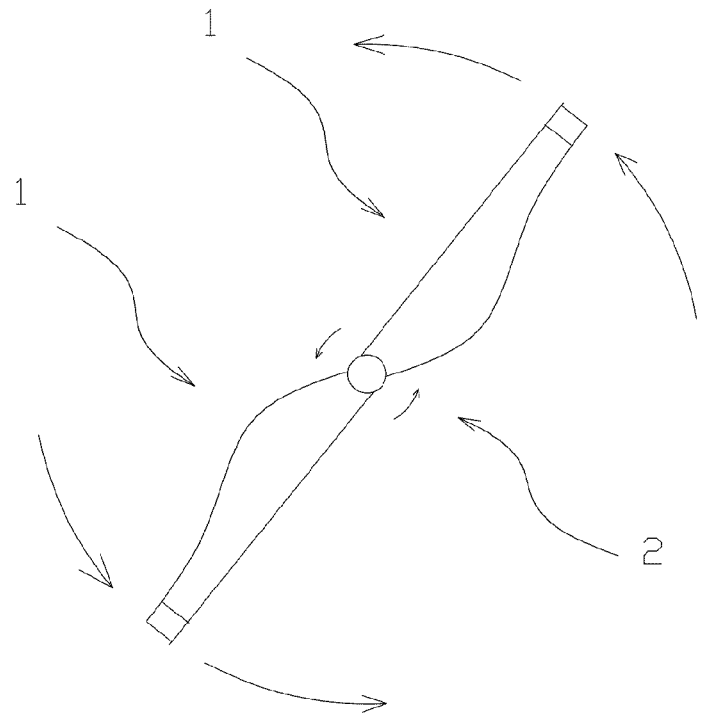
[FIG. 2]
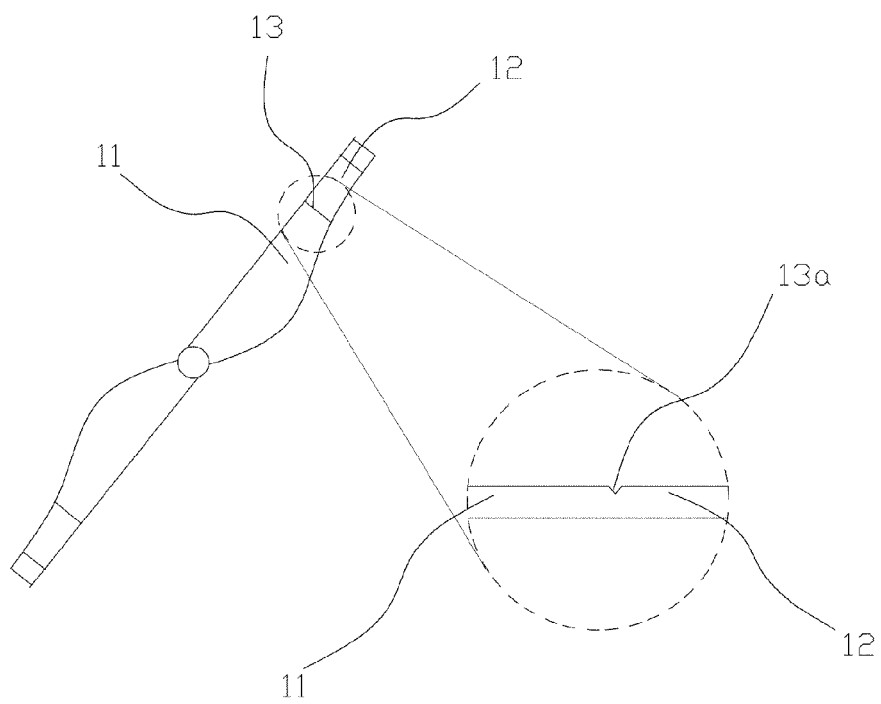

[FIG. 3]
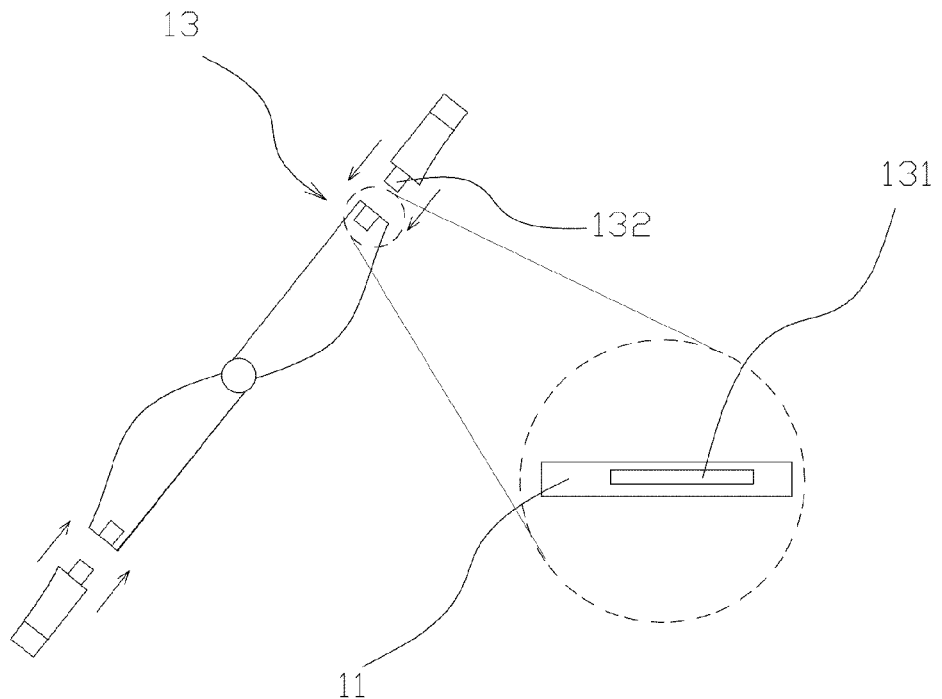
[FIG. 4]
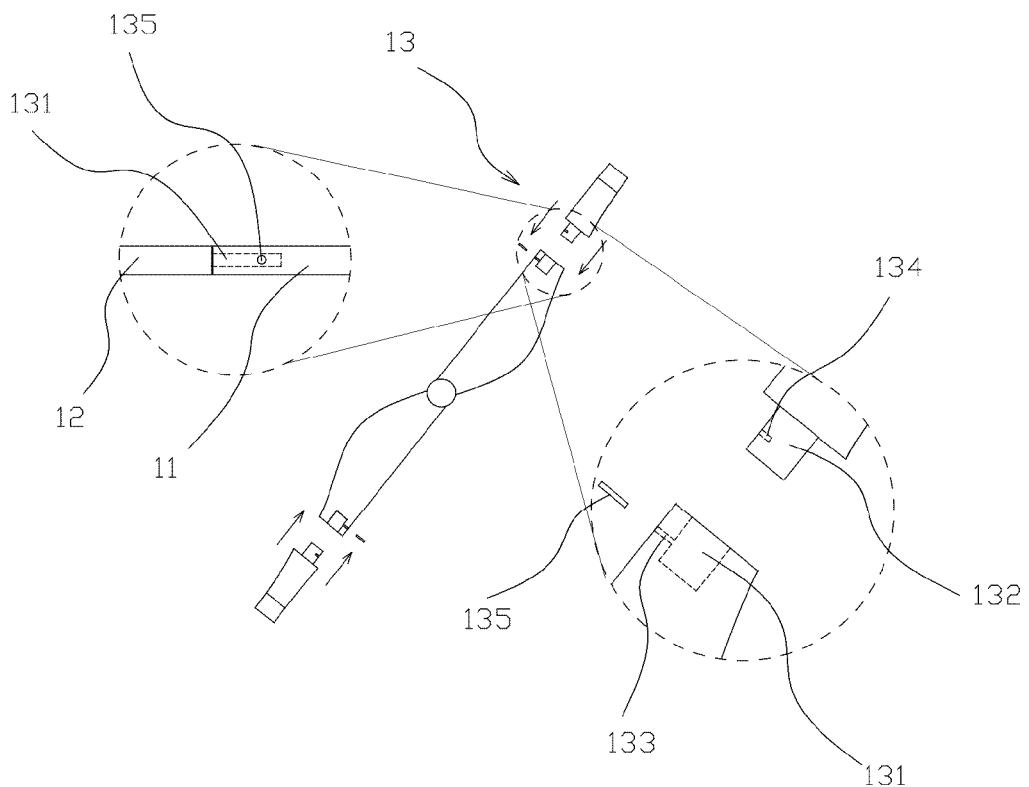

[FIG. 5]
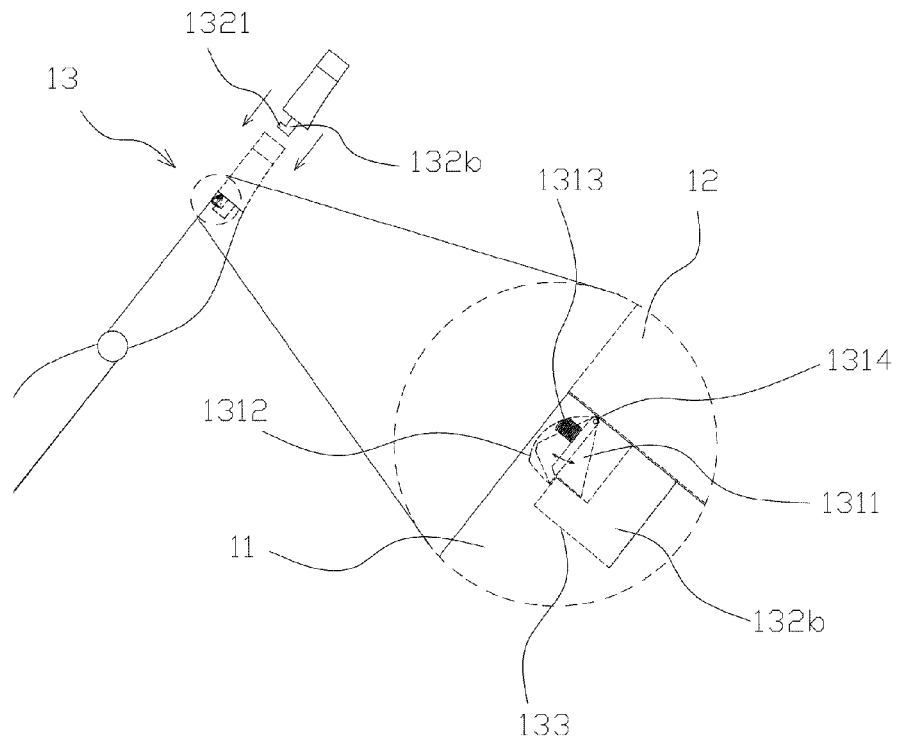
[FIG. 6]
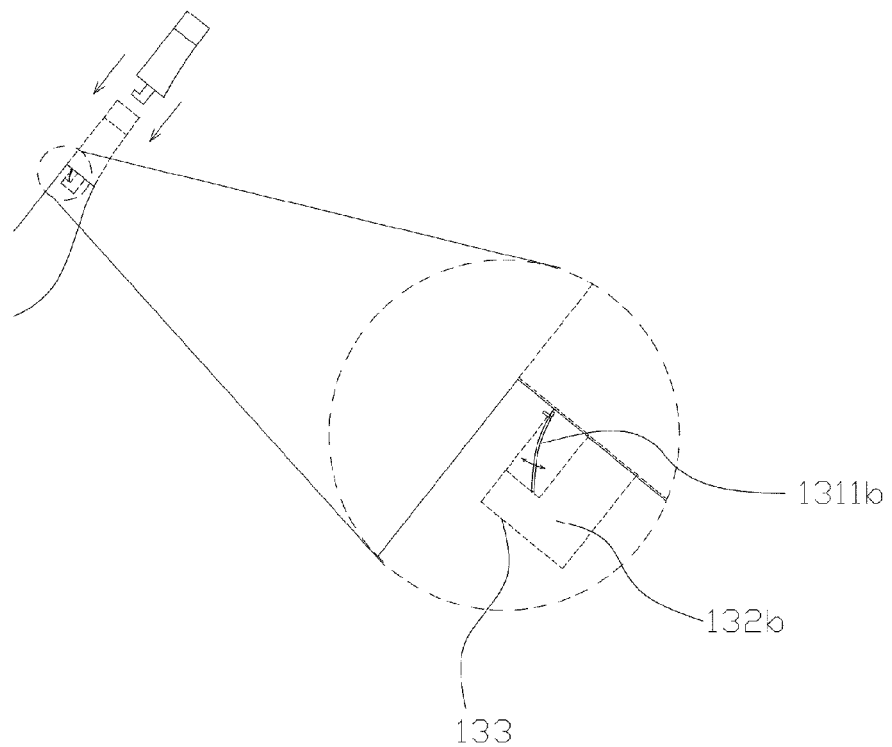

DRONE PROPELLER FOR PREVENTING COMPLETE DESTRUCTION AND DRONE COMPRISING SAME

TECHNICAL FIELD

The present invention relates to a drone propeller, and more particularly, to a drone propeller which allows only a part of a propeller to be damaged when the propeller collides during rotation, thereby allowing a drone to land without crashing.

BACKGROUND ART

A collision with an obstacle in drone control is one of the biggest causes of drone crashes. A phenomenon upon a collision with an obstacle leads to a series of results such as 1. a collision between the obstacle and a propeller, 2. a power failure of one or more flight shafts due to damage to the propeller, 3. overturning of the drone in a direction of a power failure shaft, and 4. a crash and damage of the drone.

In general, currently used drones are classified as "multicopters" according to a classification of aircraft, include an even number of four or more propeller shafts, and are propelled toward a ground surface to levitate. Here, a propeller plays an essential role in levitating a drone, and in general, a loss of one or more propellers leads to a drone crash. However, in the case of a drone with six or more shafts, the drone can maintain a hovering state without crashing until all propellers in corresponding directions are lost.

Horizontal movement of a drone is performed as follows. 1. Output of a shaft motor, which is disposed in a direction opposite to a direction in which the drone is to move, is increased, 2. the drone tilts in the direction in which the drone is to move, and 3. the drone tilts and moves. Next, vertical movement of the drone is performed as follows. 1. Output of all motors is increased/or decreased, and 2. as a result, the drone moves vertically.

A device called a gyroscope is used for a drone including a plurality of flight shafts to maintain balance without tilting in one direction. A gyroscope is the most basic sensor mounted on a main control unit (center) of a drone and is mounted on most drones currently on the market. A gyroscope is a device that detects a tilt. In a normal situation, the gyroscope detects a tilt of a drone, and when the drone tilts the gyroscope transmits more power in a tilt direction and finely adjusts output of a motor in the tilt direction at a degree of 105 to 110 according to a tilted state to maintain a level of the drone.

Motors of all drones have enough output to be able to hover even when some propellers are lost. This is because, for a climbing maneuver, the motors have more output than stop hovering. Therefore, in a case in which a propeller of a drone collides with an obstacle and is damaged, when only a portion of the propeller is lost, by increasing output of a motor, the remaining propeller maintains enough rotational force to enable stop hovering, and thus safe descent is possible. However, most broken pieces have random shapes, in general, the propeller is broken up to the vicinity of a rotary shaft, and thus the drone cannot maintain hovering and may immediately crash.

In the case of a drone crash, a loss may occur due to damage to the drone, and there is also a possibility that various types of human and material damage may occur due to a collision caused by the crash. Thus, there is a need for measures to cope with a drone crash.

Conventional drone propeller-related technologies mainly relate to implementing functions of a blade separation and detachment type, a length-variable type blade, a folding blade, and the like and thus lack provision for damage to a propeller. Related arts include Korean Patent Registration No. 10-1907649, Korean Patent Publication No. 10-2020-0028578, and Korean Utility Model No. 20-2019-0002525.

DISCLOSURE

Technical Problem

The present invention is directed to providing a drone propeller for preventing complete destruction, which prevents a complete power failure when a propeller is damaged and allows a drone to safely land through hovering and descending maneuvers, and a drone including the propeller.

Technical Solution

According to an embodiment of the present invention, a drone propeller for preventing complete destruction includes a plurality of blades (1) and a rotary shaft (2), wherein each of the blades (1) includes a rotation retaining unit (11) formed to be connected to the rotary shaft (2), a separation and detachment unit (12) which is formed at an outer side of the blade (1) and is separated when damaged, and a damage inducing unit (13) which connects the rotation retaining unit (11) and the separation and detachment unit (12) and is damaged during a collision.

A crack (13a), which is recessed to be elongated in a transverse direction of the blade, may be formed in the damage inducing unit (13).

The rotation retaining unit (11) and the separation and detachment unit (12) may be formed to be separated from each other, and the damage inducing unit (13) may include an insertion hole (131) formed in a contact surface of the rotation retaining unit (11) or the separation and detachment unit (12) and an insertion protrusion (132) formed on a contact surface opposite to the contact surface in which the insertion hole (131) is formed so that the insertion protrusion (132) is inserted into the insertion hole (131) to form the blade (1).

The damage inducing unit (13) may further include a fixing pin (135), a pinhole (133) may be formed to pass through the blade from an outside of a side surface of the blade, in which the insertion hole (131) is formed, to an inside of the blade, in which the insertion hole (131) is positioned, such that the fixing pin is inserted therein, and a pin holder (134) recessed to accommodate a portion of the fixing pin (135) passing through the pinhole (133) may be formed in the insertion protrusion (132).

The damage inducing unit (13) may include an insertion protrusion (132B) having a "¬" shape formed by forming a locking protrusion (1321) at an end portion of the insertion protrusion and a locking projection (1311) by which the locking protrusion (1321) is caught when the insertion protrusion (132b) is inserted into the insertion hole (131).

The damage induction unit (13) may further include a locking projection accommodation portion (1312) and a restoration spring (1313) for restoring the locking projection, and a locking projection pivoting shaft (1314) may be formed at a peripheral portion of the locking projection (1311) such that the locking projection is rotatable so that, when the locking protrusion (1321) is pushed, the locking projection (1311) is pushed into the locking projection accommodation portion (1312), and when the locking protrusion (1321) is completely inserted, the locking projection (1311) is restored again.

A locking projection (1311b) made of a leaf spring material may be formed as the locking projection, an outer end of the locking projection (1311b) may be fixed to a wall surface of the insertion hole (131), and an inner end thereof may be lifted to form a projection by which the locking protrusion (1321) is caught.

According to another embodiment of the present invention, a drone including a drone propeller for preventing complete destruction includes the drone propeller.

Advantageous Effects

In a drone propeller for preventing complete destruction and a drone including the propeller, when the propeller collides with an obstacle, damage to the propeller can be minimized as much as possible. Thus, since it is possible to prevent a complete power failure, output of a motor at a damaged position is increased to a level at which hovering is possible, and then safe landing is possible through a descending maneuver. Therefore, it is possible to prevent a loss due to damage to the drone and also to prevent various human and material accidents that occur during a drone crash.

DESCRIPTION OF DRAWINGS

FIG. 1 is a view illustrating a configuration of a drone propeller.

FIG. 2 is a view illustrating a drone propeller for preventing complete destruction according to an embodiment of the present invention.

FIG. 3 is a partial enlarged view showing another embodiment of a damage inducing unit of the present invention.

FIG. 4 is a partial enlarged view showing still another embodiment of a damage inducing unit of the present invention.

FIG. 5 is a partial enlarged view showing yet another embodiment of a damage inducing unit of the present invention.

FIG. 6 is a partial enlarged view showing yet another embodiment of a damage inducing unit of the present invention.

MODES OF THE INVENTION

Specific details for implementing a drone propeller for preventing complete destruction and a drone of the present invention will be described with reference to the accompanying drawings.

FIG. 1 is a view illustrating a configuration of a drone propeller that is generally widely used. As shown, the drone propeller includes two or more blades 1 which are formed to be elongated with respect to a rotary shaft 2.

In a drone propeller for preventing complete destruction of the present invention, the key is to allow a propeller to be damaged in a set shape in order to prevent crashing during a collision with an obstacle, and thus the object is to allow a drone to land normally. If a drone can fly with an output of 100 in a normal situation, when only a set part is damaged by a collision like the propeller of the present invention and a remaining part maintains rotation, only output of a corresponding motor may be increased to maintain a hovering state, and thus the drone can land through a descending maneuver.

In the drone propeller for preventing complete destruction of the present invention, various embodiments can be implemented through application to a part that guides damage. In the present invention, embodiments are mainly classified into three types as shown in FIGS. 2 to 6, that is, 1. a type using a crack shape, 2. a friction type, 3. a type using a fixing pin, and 4. a type using a locking projection.

As a basic configuration of the drone propeller for preventing complete destruction of the present invention, the drone propeller includes two or more blades 1 and a rotary shaft 2. Each of the blades 1 includes a rotation retaining unit 11 formed to be connected to the rotary shaft 2, a separation and detachment unit 12 which is formed at an outer side of the blade and is separated when damaged, and a damage inducing unit 13 which connects the rotation retaining unit 11 and the separation and detachment unit 12 and is damaged during a collision.

FIG. 2 illustrates an embodiment of a type using a crack shape of the drone propeller of the present invention, and a crack 13a, which is recessed to be elongated like a ditch in a transverse direction of the blade, is formed in the damage inducing unit 13 to induce the separation and detachment unit 12 to be separated based on the crack during a collision. The crack is formed to a depth sufficient to allow the separation and detachment unit 12 to remain during a normal flight and allow the separation and detachment unit 12 to be separated during a collision. During a collision, a drone may lose only the separation and detachment unit 12, and while the drone repeats slight vibration and restoration, the rotation retaining unit 11 may remain undamaged.

FIG. 3 illustrates an embodiment of a friction method of the drone propeller of the present invention. To this end, the rotation retaining unit 11 and the separation and detachment unit 12 are formed to be separated from each other. The damage inducing unit 13 includes an insertion hole 131 and an insertion protrusion 132. The insertion hole 131 and the insertion protrusion 132 are coupled through an interference fit in a friction manner to connect the rotation retaining unit 11 and the separation and detachment unit 12. Although the insertion hole 131 at a side of the rotation retaining unit 11 is illustrated in FIG. 3 for such a shape, the insertion hole 131 that is deeply recessed may be formed in a contact surface of the rotation retaining unit 11 or the separation and detachment unit 12, and the insertion protrusion 132 may be formed on an opposite connection surface of the rotation retaining unit 11 or the separation and detachment unit 12 to correspond to the insertion hole 131 so that the insertion protrusion 132 is inserted into the insertion hole 131 to form the blade 1. Here, a friction force allows the separation and detachment unit 12 to endure a centrifugal force during rotation but allows the separation and detachment unit 12 to not resist an external force caused by a collision.

FIG. 4 illustrates an embodiment of a type using a fixing pin of the drone propeller of the present invention. In order to implement this type, the damage inducing unit 13 further includes a fixing pin 135 in addition to the components of FIG. 3. A pinhole 133 is formed to pass through the blade from the outside of a side surface of the blade, in which the insertion hole 131 is formed, to the inside of the wall, in which the insertion hole 131 is positioned, such that the fixing pin may be inserted therein. In addition, a pin holder 134 recessed to accommodate a portion of the fixing pin 135 passing through the pinhole 133 may be formed in the insertion protrusion 132. Thus, after the separation and detachment unit 12 is insertion-coupled to the rotation retaining unit 11, the fixing pin 135 is insertion-fixed. Thus, during normal flight, the separation and detachment unit 12 is rotated by being supported by the fixing pin 135, but during a collision, the thin pin is broken to separate the separation and detachment unit 12. Although the pinhole 133, the pin holder 134, and the fixing pin 135 are illustrated in FIG. 4 as being formed at one side of the blade, the pinhole 133, the pin holder 134, and the fixing pin 135 may be installed at both sides of the blade if necessary.

FIGS. 5 and 6 illustrate embodiments of a type using a locking projection of the drone propeller of the present invention. FIG. 5 illustrates a type using a locking projection of a rotation restoration type, and FIG. 6 illustrates a type using a locking projection made of a leaf spring material. In order to implement this type, the damage inducing unit 13 includes an insertion protrusion 132b having a "¬" shape formed by forming a locking protrusion 1321 formed at an end portion of the insertion protrusion and further includes a locking projection 3111 by which the locking protrusion 1321 may be caught when the insertion protrusion 132b is inserted into the insertion hole 131.

The locking projection 1311 may be implemented in various types, but as shown in FIG. 5, a locking projection of a rotation restoration type may be used. To this end, the damage inducing unit 13 further includes a locking projection accommodation portion 1312 and a restoration spring 1313 for restoring the locking projection. A locking projection pivoting shaft 1314 is formed at a peripheral portion of the locking projection 1311 such that the locking projection is rotatable. Thus, when the locking protrusion 1321 is pushed, the locking projection 1311 may be pushed into the locking projection accommodation portion 1312, and when the locking protrusion 1321 is completely inserted, the locking projection 1311 may be formed to be restored again.

As another implementation type of the locking projection 1311, as shown in FIG. 6, a locking member including a leaf spring material may be used. A locking projection 1311b made of a leaf spring material may be formed as the locking projection, and an outer end of the locking projection 1311b may be fixed to a wall surface of the insertion hole 131, and an inner end thereof may be lifted to form a projection by which the locking protrusion 1321 may be caught.

Of course, a drone propeller for preventing complete destruction and a drone including the propeller and using the technical idea may belong to the scope of the present invention.

The invention claimed is:

1. A drone propeller for preventing complete destruction, the drone propeller comprising:
    a plurality of blades; and
    a rotary shaft,
    wherein each of the blades includes:
    a rotation retaining unit connected to the rotary shaft;
    a separation and detachment unit which is formed at an outer side of the blade and is separated when damaged; and
    a damage inducing unit connecting the rotation retaining unit and the separation and detachment when damaged upon a collision,
    wherein the rotation retaining unit and the separation and detachment unit are separated from each other, and the damage inducing unit includes an insertion hole formed in a contact surface of the rotation retaining unit or the separation and detachment unit and an insertion protrusion formed on a contact surface opposite to the contact surface in which the insertion hole is formed so that the insertion protrusion is inserted into the insertion hole to form the blade.

2. The drone propeller of claim 1, wherein a crack, which is recessed and elongated in a transverse direction of the blade, is formed in the damage inducing unit.

3. The drone propeller of claim 1, wherein:
    the damage inducing unit further includes a fixing pin;
    a pinhole is formed to pass through the blade from an outside of a side surface of the blade, in which the insertion hole is formed, to an inside of the blade, in which the insertion hole is positioned, such that the fixing pin is inserted therein; and
    a pin holder recessed to accommodate a portion of the fixing pin passing through the pinhole is formed in the insertion protrusion.

4. The drone propeller of claim 1, wherein the damage inducing unit includes an insertion protrusion having L shape formed by forming a locking protrusion formed at an end portion of the insertion protrusion and a locking projection by which the locking protrusion is caught when the insertion protrusion is inserted into the insertion hole.

5. The drone propeller of claim 4, wherein the damage induction unit further includes a locking projection accommodation portion and a restoration spring for restoring the locking projection, and a locking projection pivoting shaft is formed at a peripheral portion of the locking projection such that the locking projection is rotatable so that, when the locking protrusion is pushed, the locking projection is pushed into the locking projection accommodation portion, and when the locking protrusion is completely inserted, the locking projection is restored again.

6. The drone propeller of claim 4, wherein: a locking projection made of a leaf spring material is formed as the locking projection; and
    an outer end of the locking projection is fixed to a wall surface of the insertion hole, and an inner end thereof is lifted to form a projection by which the locking protrusion is caught.

7. A drone comprising the drone propeller for preventing complete destruction of claim 1.

\* \* \* \* \*